(12) United States Patent
Srinivasan (10) Patent No.: US 11,981,044 B2
(45) Date of Patent: May 14, 2024

(54) SHAPEABLE HOT SCOOP FOR MATERIAL REMOVAL

(71) Applicant: Viswesh Srinivasan, Chennai (IN)

(72) Inventor: Viswesh Srinivasan, Chennai (IN)

( * ) Notice: Subject to any disclaimer, the term of this patent is extended or adjusted under 35 U.S.C. 154(b) by 759 days.

(21) Appl. No.: 16/640,794

(22) PCT Filed: Aug. 21, 2018

(86) PCT No.: PCT/IN2018/050540
§ 371 (c)(1),
(2) Date: Feb. 21, 2020

(87) PCT Pub. No.: WO2019/038785
PCT Pub. Date: Feb. 28, 2019

(65) Prior Publication Data
US 2021/0031397 A1 Feb. 4, 2021

(30) Foreign Application Priority Data

| Aug. 22, 2017 | (IN) | ............................ 201741029777 |
| Oct. 16, 2017 | (IN) | ............................ 201743036596 |
| Nov. 20, 2017 | (IN) | ............................ 201741041577 |
| Jun. 19, 2018 | (IN) | ............................ 201841022791 |

(51) Int. Cl.
*B26D 5/00* (2006.01)
*B23Q 15/12* (2006.01)
*B26F 3/12* (2006.01)
*G05B 19/18* (2006.01)

(52) U.S. Cl.
CPC ............. *B26D 5/005* (2013.01); *B23Q 15/12* (2013.01); *B26D 5/007* (2013.01); *B26F 3/12* (2013.01); *G05B 19/182* (2013.01); *G05B 2219/33099* (2013.01); *G05B 2219/45042* (2013.01)

(58) Field of Classification Search
CPC ........... B26D 5/005; B26D 5/007; B26F 3/12; G05B 2219/45042; G05B 2219/33099; B23Q 15/12
See application file for complete search history.

(56) References Cited

U.S. PATENT DOCUMENTS

| 2,526,650 | A | * | 10/1950 | Gaibel | ...................... B26F 3/12 83/171 |
| 3,901,110 | A | * | 8/1975 | Priestly | .................... B26F 3/12 83/171 |
| 4,393,450 | A | * | 7/1983 | Jerard | .................... G05B 19/41 125/21 |
| 2011/0314984 | A1 | * | 12/2011 | Stege | .................... G05B 19/19 83/13 |
| 2018/0050460 | A1 | * | 2/2018 | Gonzalez Bohme | .. B26D 3/006 |

FOREIGN PATENT DOCUMENTS

| AT | 509709 B1 * 11/2011 | ........... B26B 27/002 |
| DE | 202008015592 U1 * 4/2009 | ........... B26D 7/2614 |
| DE | 202009007199 U1 * 10/2009 | ............. B26D 3/008 |

(Continued)

*Primary Examiner* — Jonathan G Riley (57) ABSTRACT

The shapeable hot scoop is required to remove material by cutting and scooping. It is necessary to change the shape of the scooping tool automatically. This invention proposes several mechanisms for changing shape of the scooping tool automatically. Method of detection & correction of cutting wire lag is also proposed in this invention.

2 Claims, 12 Drawing Sheets

(56) References Cited

FOREIGN PATENT DOCUMENTS

| DE | 102010048915 A1 | * | 4/2012 | ............... B26D 1/48 |
| EP | 2910352 A1 | * | 8/2015 | ............... B26F 3/12 |
| KR | 20140043796 A | * | 4/2014 | |
| KR | 101486300 B1 | * | 12/2016 | |
| KR | 102274359 B1 | * | 7/2021 | |
| WO | WO-2018122881 A1 | * | 7/2018 | ............... B26D 5/20 |

* cited by examiner

SHAPEABLE HOT SCOOP FOR MATERIAL REMOVAL

This invention also proposes a sensor for monitoring the deflection of the cutting tool, thus preventing, correcting geometric in-accuracies because of cutting tool deflection. The present application is based on, and claims priority from an Indian Application Number, 201741029777 filed on 22 Aug. 2017, Indian Application Number, 201741041577 filed on 20 Nov. 2017, Indian Application Number, 201743036596 filed on 16 Oct. 2017, Indian Application Number, 201841022791 filed on 19 Jun. 2018, and PCT Application PCT/IN2018/050540 filed on 21 Aug. 2018, the disclosure of which is hereby incorporated by reference herein.

FIELD OF INVENTION

This invention relates to the field of CNC profile cutting. This invention proposes a special tool and cutting method, which enables the shape of the tool to be dynamically controlled automatically, thus achieving desired material removal.

BACKGROUND OF INVENTION

In CNC profile cutting machines, it is often required to remove material by scooping.

But it is necessary to change the shape of the scooping tool depending on design. This is usually a manual and time-consuming process, prone to dimension errors.

Hence there is a need to develop a new tool and cutting method, which enables the shape of the tool to be dynamically controlled automatically, thus achieving desired material removal.

Also cutting tool deflection causes geometric in-accuracies. Hence there is a need to develop a sensor for monitoring and correction of the deflection.

OBJECT OF INVENTION

The principal object of this invention is to develop a new tool and cutting method, which enables the shape of the tool to be dynamically controlled automatically, thus achieving desired material removal.

Another objective of this invention is to develop a sensor for monitoring the deflection of the cutting tool, thus preventing, correcting geometric in-accuracies because of cutting tool deflection.

These and other objects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. For example, it should be noted that while some embodiments are explained with respect to cutting of EPS material using Heated wire, any other application may also incorporate the subject matter of the invention with little or no modifications. Accordingly, the examples should not be construed as limiting the scope of the embodiments herein.

The embodiments herein describe an intelligent automated CNC cutting machine 100 using shapeable tool with sensors for tool deflection measurement and CNC control system for correction. Referring now to the drawings, and more particularly to FIGS. 1 through 14, where similar reference characters denote corresponding features consistently throughout the figures, there are shown embodiments.

Figure 1:
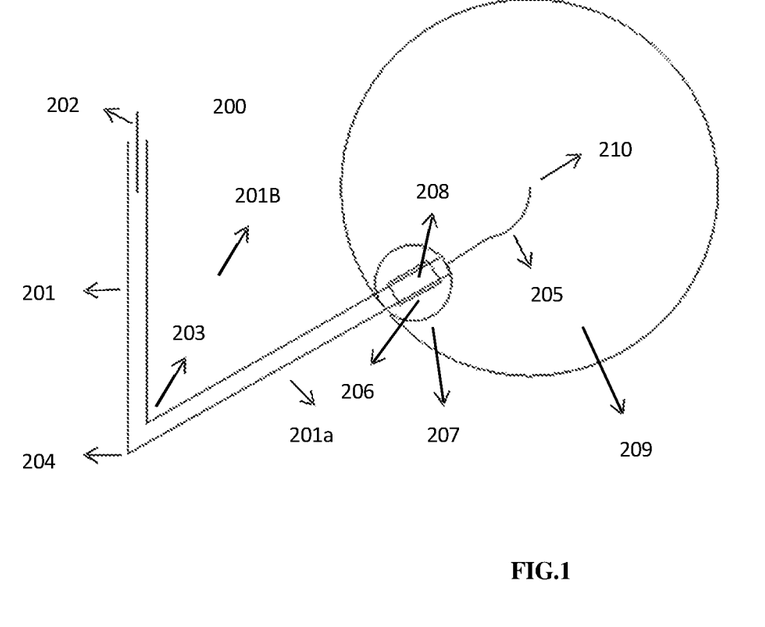
FIG. 1 depicts the proposed half-V adjustable tool along with the actuation mechanism.

FIG. 1 shows a variable angle scooping tool 200, in the shape of a half-V.

It consists of a vertical cutting edge 201 and an inclined cutting edge 201a. The cutting edges are typically hollow metal tubes. Through the hollow tubes, Insulated heating wire (NiCr etc.) 202-205 is passed through, to achieve heating.

For 3D scooping the tool is typically mounted such that the vertical edge 201 is along a rotary position CNC axis (typically C axis with axis along Z-axis). It is desirable to keep the vertical element at center always without deviating. A slit 203 is taken in the hollow tube and then bent. This will ensure bending happens easily at the joint without much force.

The actuator for changing the angle is also shown in FIG. 1. It consists of a larger circular disk or lever 209 with center of rotation 210. 208 is a pivot point on disk 209. Disc 207 is free to rotate about pivot point 208.

Another hollow tube 206 is fixed to the disc 207. The ID of 206 is slightly larger than the OD of 201a, such that 201a can freely slide inside 206.

By controlling the angular position of disc 209, by using a rotary actuator, it is possible to control the angle of the tool between 201 and 201a.

Figure 2:
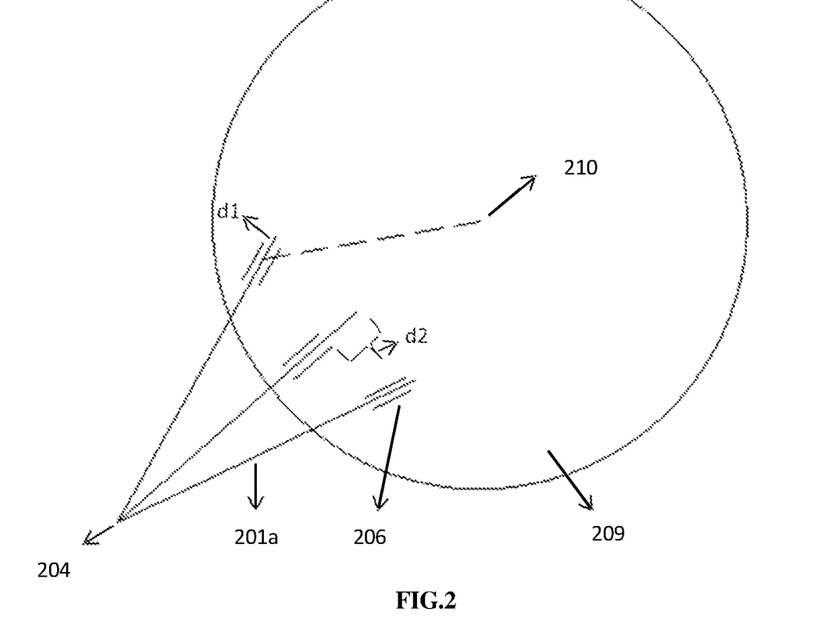
FIG. 2 depicts the half-V adjustable tool at different angular positions.

Heating wire 205 coming out of one end of 201a is flexible and is electrically connected for powering the wire for heating. Since the wire is flexible, it can maintain contact even during the angular motion FIG. 2 shows the self-alignment of disc 207 and hence tube 206 at different angular position of 201a.

Figure 3:
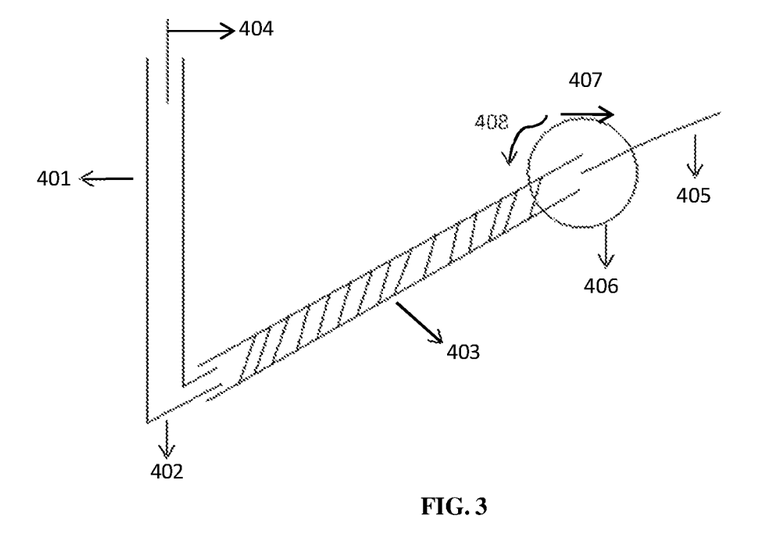
FIG. 3 depicts the proposed half V curved adjustable tool.

Sometimes it is desirable for cutting edge 201a to be curved. FIG. 3 shows an arrangement to achieve this. It consists of a vertical cutting edge 401 and a ~45 deg bend 402. 403 is a hollow flexible spring attached on one end to 402 and held on another end to a disc 406, which is connected to a CNC controlled rotary actuator.

Figure 4:
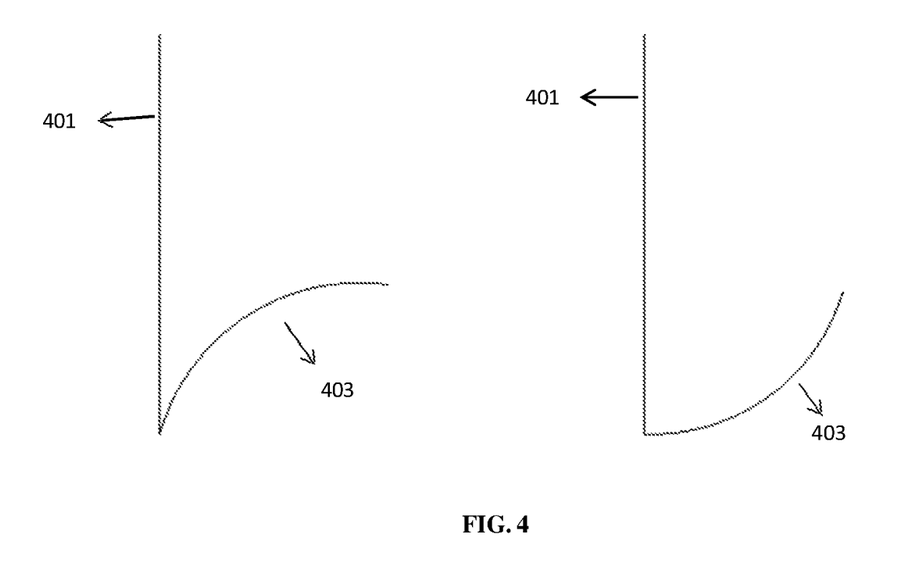
FIG. 4 depicts the half V curved adjustable tool at different curvatures.

By rotating disc 406, the ending tangent of the flexible spring 403 can be controlled. By this method, 403 can assume a concave or convex shape as shown in FIG. 4.

Flexible spring with a heating element inside is a very useful tool that can be used in multiple situations. In patent application 201743028765, the long cutting tool needs to bend. This can be achieved by using flexible spring as outer element and heating wire as inner element, allowing the tool to easily bend and un-bend, resulting in a compact system.

Figure 5:
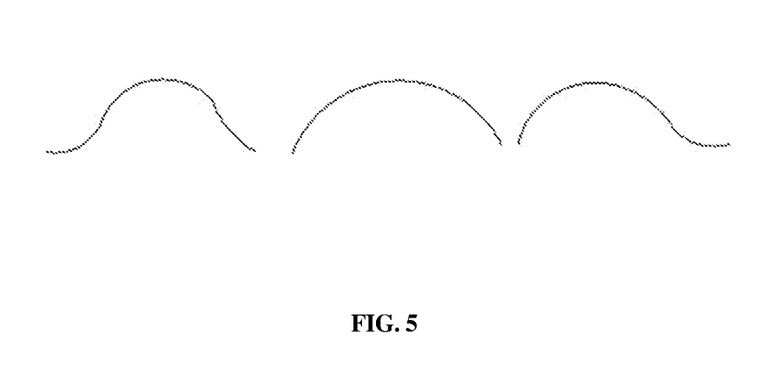
FIG. 5 depicts proposed long hot knife with flexible spring outer, taking different curved shapes.

The flexible spring can be made to take a curved shape by controlling the start tangents at both ends of the wire, where it is held. The distance between the 2 holding points can also be adjusted. Thus, it becomes possible to adjust the shape of the cutting wire dynamically as shown in FIG. 5. A camera can be optionally used to check the shape of the wire and the feedback can be used to achieve exact desired shape.

Figure 6:
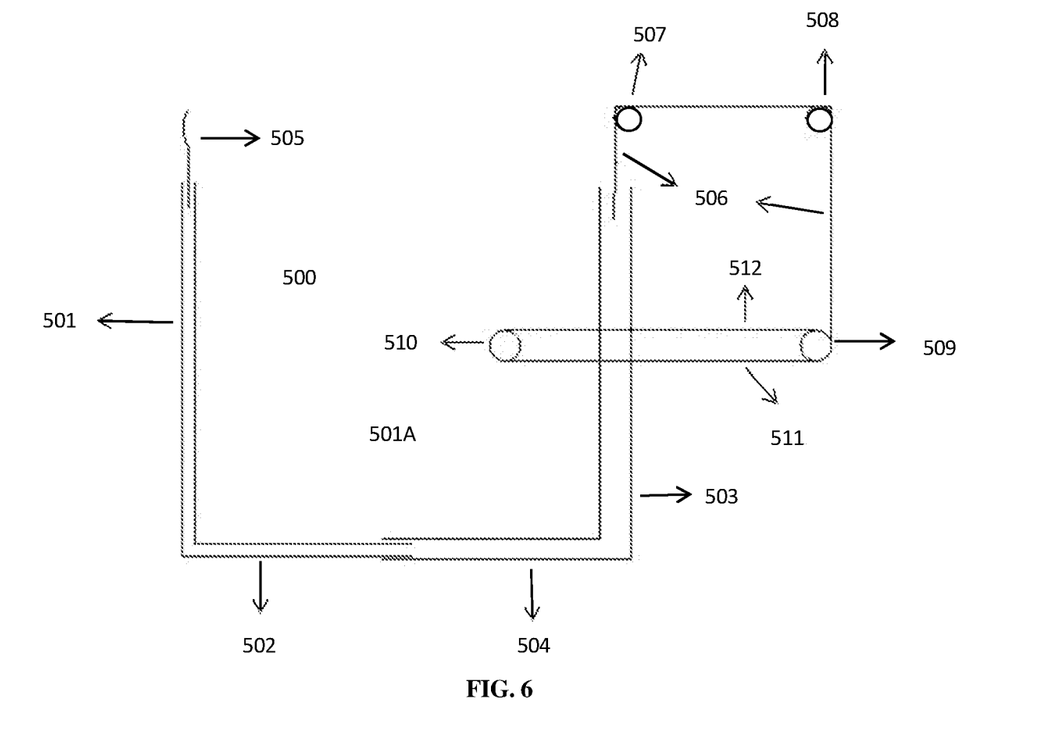
FIG. 6 depicts the proposed adjustable rectangular scooping tool.

For packing application, it is desirable to have a scooping tool of variable width. FIG. 6 shows the scoop tool arrangement, where the width can be controlled manually or by a rotary actuator connected to a CNC controller.

Referring to FIG. 6, The tool consists of vertical cutting edge 501, horizontal cutting edge 502, Another horizontal cutting edge 504 and another vertical cutting edge 503. The cutting edges are typically thin hollow metal tubes. Insulated heating wire 505 to 506 is passed through the hollow tubes to achieve heating action.

The ID of 504 is slightly larger than OD of 502, such that 502 can easily slide inside 504.

By moving the tubes 503 & 504 to left or right, the effective width of the tool can be decreased or increased respectively. This operation can be manual or automatic.

Angular position of Pulley 509 is controlled by a CNC controlled rotary actuator. String/belts 511 & 512 pass over idler pulley 510.

Tube 503 is attached to bottom belt 511. (or to top belt 512 if pulley 509 is to the left of the 503 tube)

Thus, by rotating the actuator, the position of tube 503 and hence the width of the tool can be controlled.

As width of the tool decreases or increases, the heating wire 505-506 tends to slacken/stretch respectively.

For small strokes, this string can be spring loaded to overcome slacking/stretching. In fact, the entire horizontal tubes 502 & 504 can be replaced by a single flexible hollow spring: for smaller strokes.

For longer strokes, the wire 506 is passed over idler pulleys 507 & 508 (optional) and wound on to the driver disc 509.

Now when tool width decreases, the excess wire will get wounded onto 509, preventing slacking and vice-versa.

Figure 7:
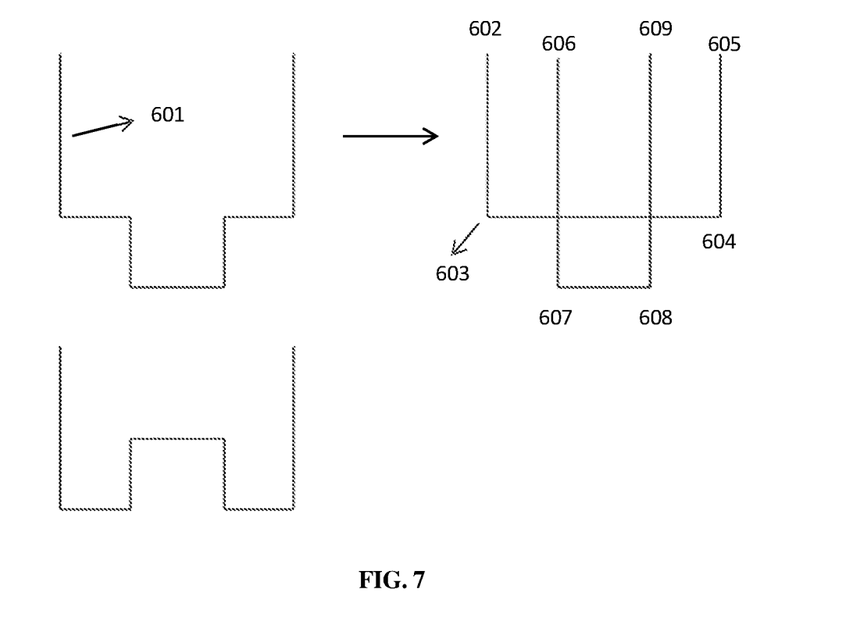
FIG. 7 depicts the proposed adjustable rectangular scooping tool combo forming a complex shape.

For packing, it is desirable to have wires bent in different shapes as shown in FIG. 7. This can be achieved by using multiple variable width tools placed next to each other as shown in FIG. 7.

FIG. 7 shows tools 602-603-604-605 and tool 606-607-608-609 mounted very near to each other, resulting in the desired shape.

The overall tool can be raised up/down to achieve variable depth also.

Figure 8:
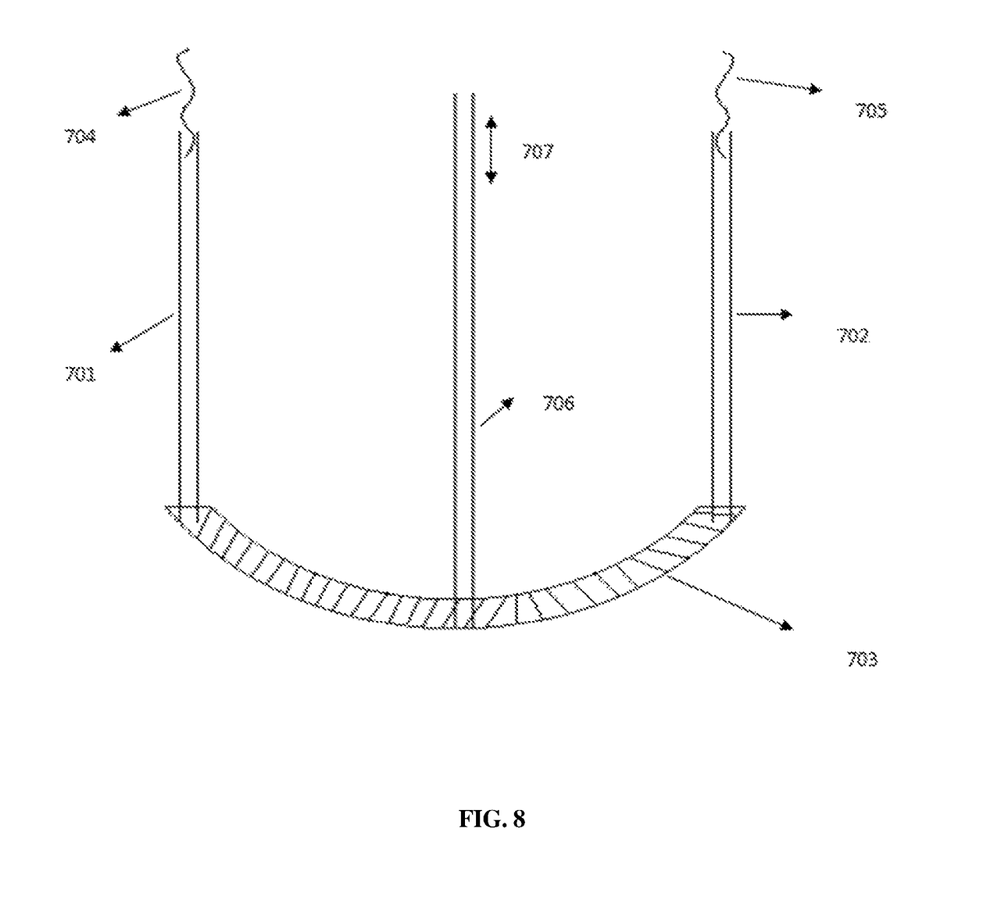
FIG. 8 depicts the proposed adjustable curved scooping tool.

FIG. 8 shows a shapeable scooping tool whose shape & profile radius can be controlled.

It consists of hollow vertical tubes 701 & 702. 703 is a hollow flexible spring attached between 701 & 702.

704-705 is an insulated heating element that passes through 701, 703 & 702, thus heating all 3 tubes.

706 is another optional hollow tube cutting edge whose bottom tip is attached to middle of 703.

706 can be moved up/down along axis 707.

Distance D1 between 701 & 702 is adjustable manually or automatic.

Figure 9:
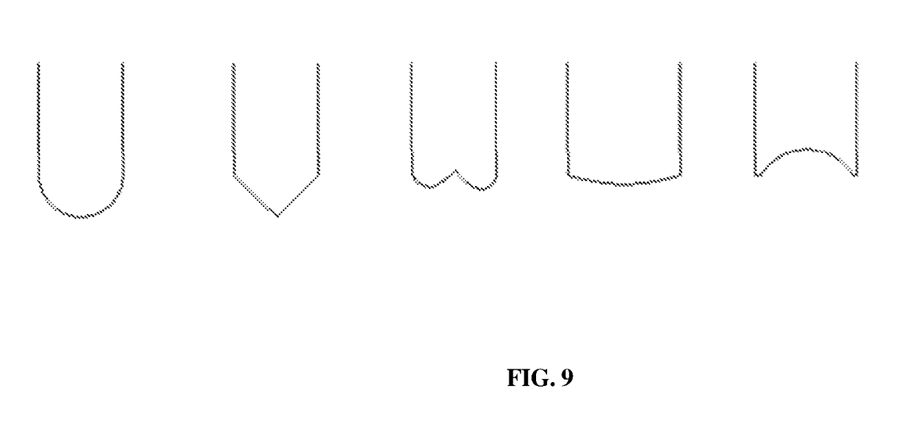
FIG. 9 depicts the proposed adjustable curved scooping tool at different curvatures.

By controlling D1 and axis 707, the flexible tube 703 can be made to take different shapes as shown in FIG. 9.

A camera can be optionally used to monitor the output shape and fine adjustment of D1 and axis 707 can be effected to achieve the exact desired curved shape.

While FIGS. 1 & 2 show a half V tool, the same can be mirrored to achieve a full V cutting tool. Even the 2 half V angles can be controlled independently optionally.

Half V cutting edge is unique to 3 or 4-axis wire cutting process and can't be achieved in milling tool.

By controlling XYZC and tool angle and using half or full V tool, complex 3D designs can be machined easily.

The looped wire cutting is applicable to processes like foam cutting, wire EDM metal cutting etc.

Figure 10:
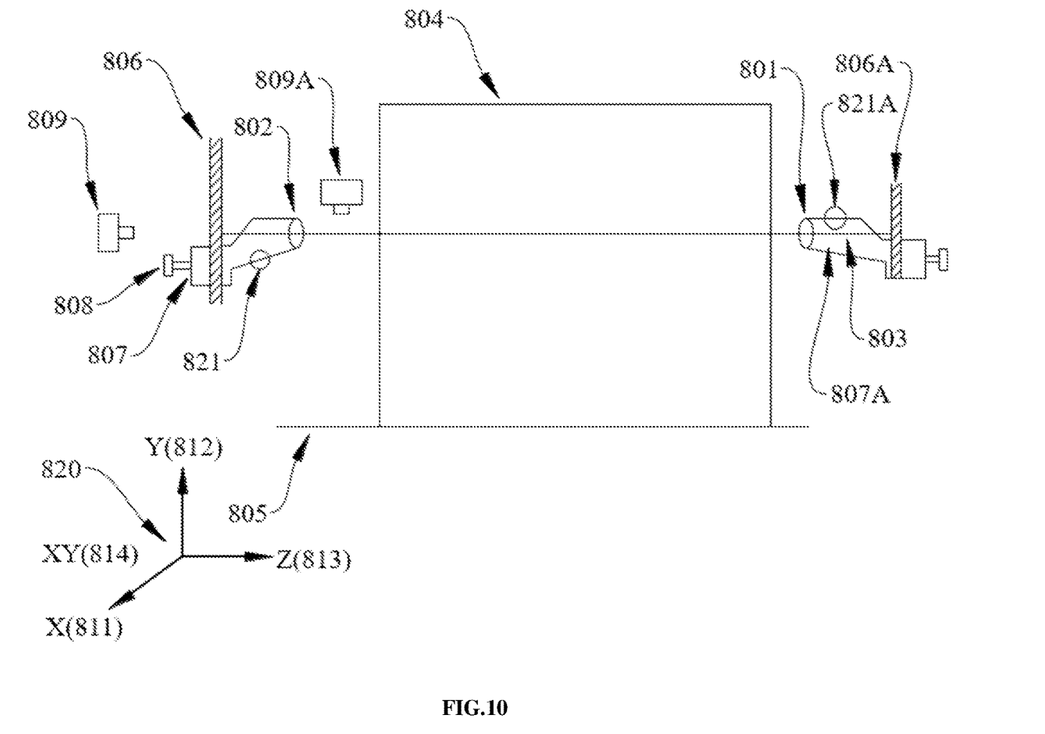
FIG. 10 depicts the proposed wire lag detection system using RING sensor.

FIG. 10 shows a foam block (804) sitting on base (805). Cutting wire (803) is cutting through the block. The wire is held between teethed poles pole1 (806), pole2 (806A). In FIG. 10, 810 shows the co-ordinate system, with X-axis (811), Y-axis(812), Z-axis(813), XY-plane(814), XZ-plane (815). Since move direction of cutting wire (803) can be anything from 0 to 360 degrees, deflection can be in any direction in the XY plane (814).

(801) and (802) are metallic ring sensors mounted around the wire. The rings are held by clamp1 (807), clamp2(807A) to pole1, pole2 respectively, and the clamps (807, 807A) are attached/clamped to the pole (806, 806a) by handle (808). The ring sensor (802) consists of current sensor in the shorting/bypass circuit consisting of clamps (807, 807A), so feedback on deflection state is available to the CNC system (100)

As the wire cuts through the block, variation in density causes the wire to lag. When the wire lags in any direction, it will contact the ring sensor.

When contact happens, the portion of heating wire between 806 to 802 AND 801 to 806a is shorted by the clamp 807.

Now the same voltage is applied across a shorter heating wire. This raises the wire temperature. This helps the wire to melt the foam faster, helping to overcome the resistance from foam material and become straight again.

When wire becomes straight, contact with ring sensor is broken and wire returns to the original configuration and temperature.

This cycle continues keeping the wire straight most of the time.

The ring sensor can optionally be inductive/capacitive sensors, thus behave like analog sensors, capable of detecting wire lag much earlier for a faster response.

The resistance of clamp 807 can be optionally controlled/adjusted, thus controlling the effective current/temperature at time of contact with the ring sensor.

The clamp 807 has a slit in top or bottom, thus allowing for repositioning of the string along the pole 806.

Multiple string can be used for cutting with similar arrangement for each string.

Figure 11:
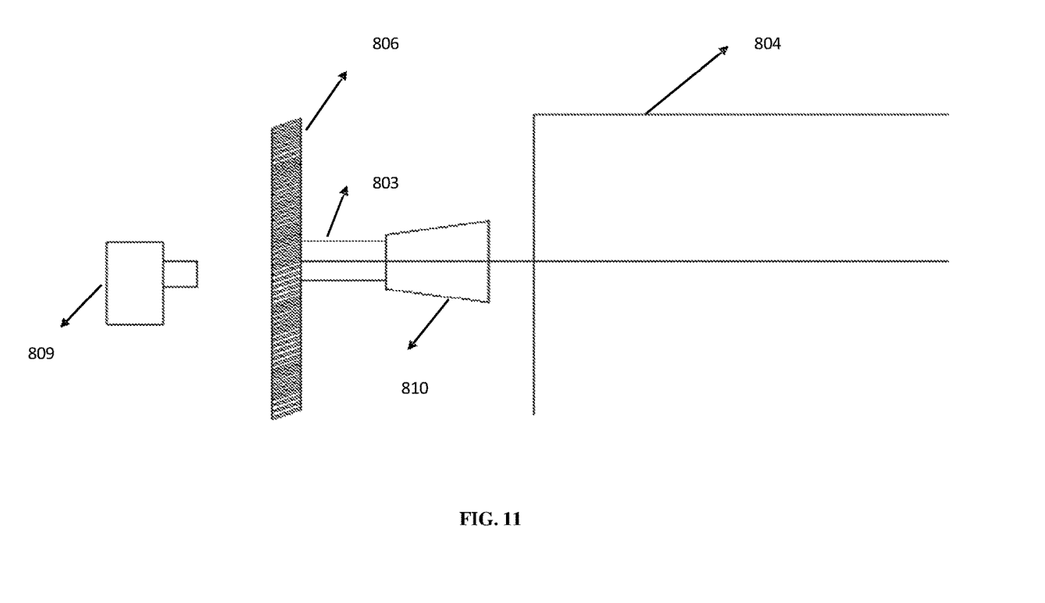
FIG. 11 depicts the proposed wire lag detection system using camera sensor and a bead.
Figure 12:
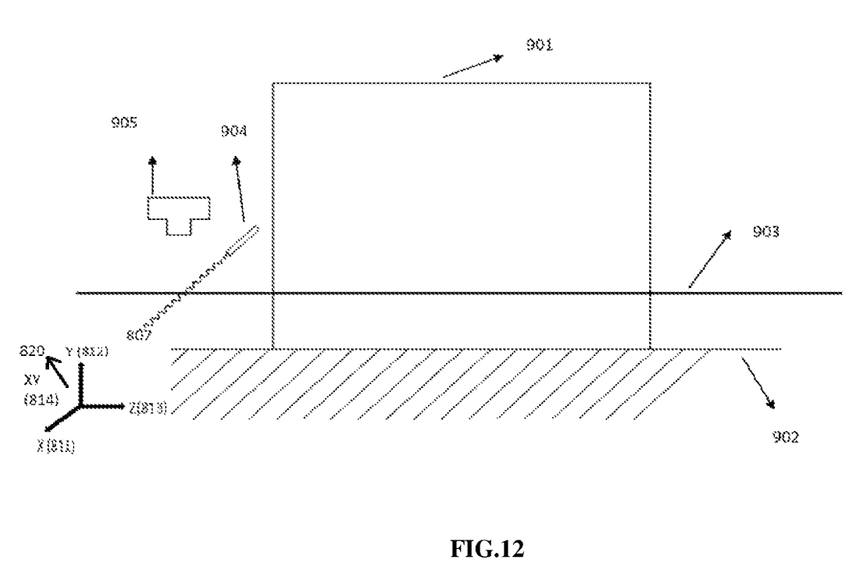
FIG. 12 depicts the proposed wire lag detection system using camera plus LASER sensor.

In another implementation, a camera 809 is fixed to the pole, looking along the length of the wire.

The wire being very thin is difficult to be spotted by the camera 809.

It is proposed to have a bead attached to the wire as close as possible to the foam material, but not touching the foam.

The bead 810 is dark in color and also tapered as shown in FIG. 11. This facilitates camera to see the edge of the face of the bead closest to the foam, as displacement is maximum near the foam block.

When wire lags, the bead is displaced which can be spotted by the camera 809 easily and corrective action can be taken, either by increasing current or decreasing feedrate.

Camera 809 can also spot the kerf width created by the cutting wire. Tool path can be dynamically compensated based on the measured kerf width. Alternately current thru the wire or feedrate can be adjusted to achieve a constant kerf width.

A LASER triangulation based sensor is proposed in this invention.

Figure 13:
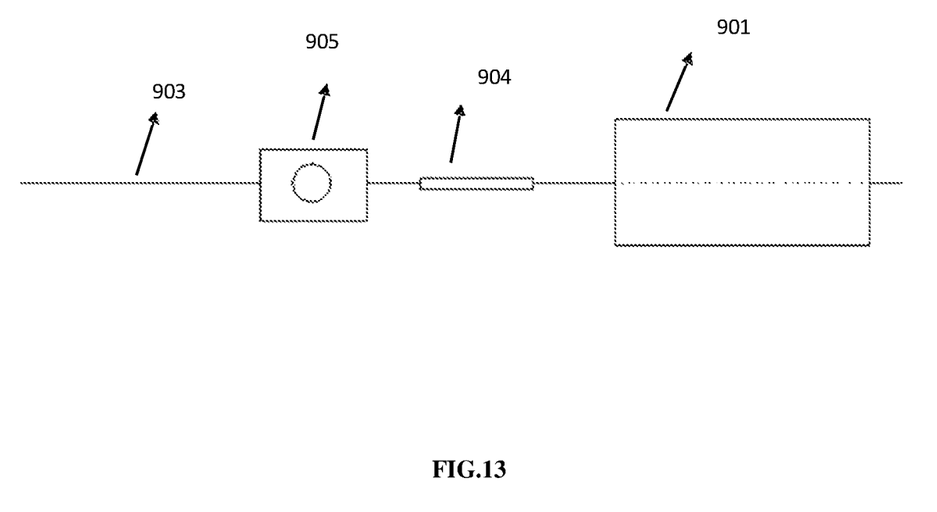
FIG. 13 depicts the proposed wire lag detection system using camera and LASER sensor (top view)
Figure 14:
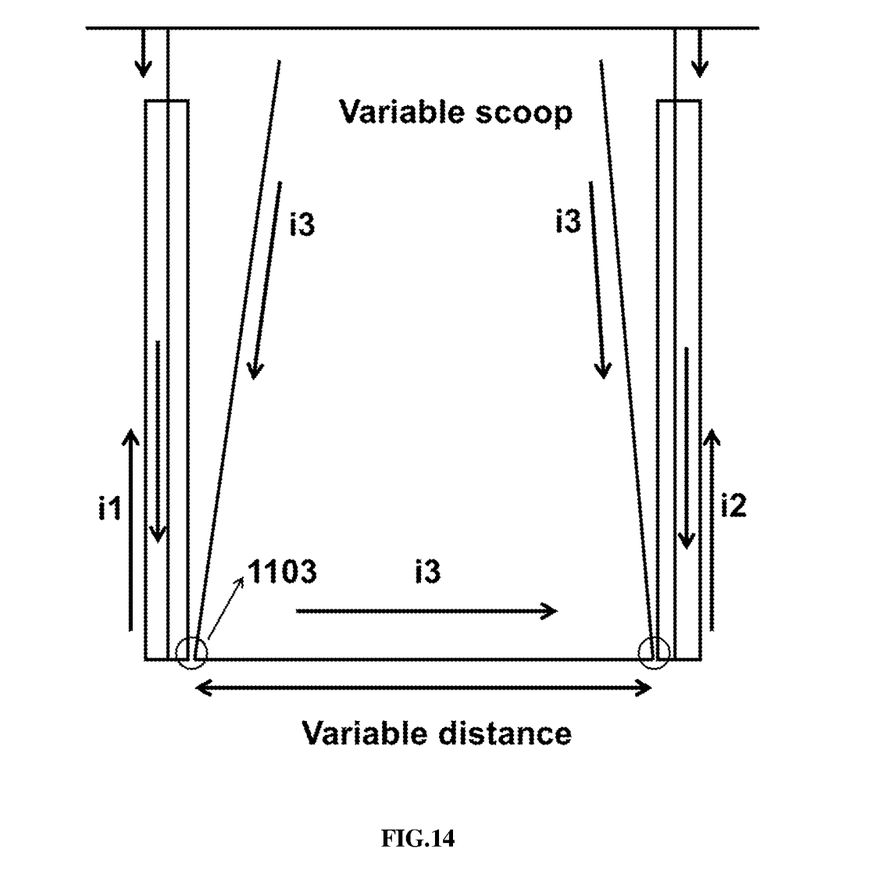
FIG. 14 depicts the proposed composite hot-scoop.

A camera (905) is placed on top of the wire (903) exiting the raw material being cut, as shown in FIG. 13.

The camera is looking vertically down directly at the wire.

A LASER line generator (904), is at approximately 45 deg. (can be at any other angle non-parallel to camera, preferably at 45 degrees)

FIG. 13 shows top view of the camera (905), LASER (904) and wire (903).

The LASER line falls on the thin wire and this small spot alone is seen by the camera.

If wire deflects in X direction, the LASER dot seen by camera also shifts in X direction.

If wire deflects in Y-direction, the LASER dot seen by camera, shifts in Z-direction.

Thus the same camera, LASER system is able to find deflection in both directions.

Also both camera & LASER are pointing down, thus preventing dust from settling on them.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

I claim:

1. A Computer Numeric Control (CNC) material cutting system (100), comprising:
   a cutting wire (803) used to cut a block of material (804), the cutting wire (803) connected from a first pole (806) to a second pole (806A),
   wherein the cutting wire (803) is heated by passing current from the first pole (806) to the second pole (806A),
   a first ring sensor (801) held by a clamp (807) to the first pole (806) and a second ring sensor (802) held by clamp (807A) to the second pole, (806A) where the cutting wire (803) passes through the first ring sensor (801) and second ring sensor (802), wherein the first and second ring sensors (801,802) comprise metallic rings, placed concentric to the cutting wire (803), such that if the cutting wire (803) deflects by a cutting force, the cutting wire (803) will touch one of the first or second ring sensors (801, 802), which causes one of the first or second clamps (807,807A) to short circuit a portion of the cutting wire (803), thus an effective length of the cutting wire (803) decreases, producing more current and heat in the cutting wire (803), wherein the cutting wire (803) is able to cut the material (804) without deflection, and
   a camera sensor (809)
   wherein the cutting wire (803) is along Z-axis (813), used to cut a block of material (804), with the camera sensor (809), the camera sensor (809) is placed perpendicular and co-axial to the cutting wire (803), viewing at and detecting a position deviation of a conical bead of material (810), stringed on to the cutting wire (803), thus detecting wire deflection due to cutting forces in any 360 degrees in XY plane (814), the camera sensor also using deflection data to adjust the cutting speed of the cutting wire (803) to reduce the wire deflection.

2. The CNC material cutting system with the cutting wire (803) and the camera sensor (809), as claimed in claim 1, comprises: the camera sensor (809) measuring the Kerf width of the path cut by the cutting wire (803), wherein the CNC material cutting system (100) adjust the current through the wire or cutting feedrate to achieve a constant consistent kerf width during the entire cutting process.

* * * * *